April 25, 1933. G. E. HOWARD 1,905,468
PROCESS AND APPARATUS FOR FORMING SHAPED MOLD CHARGES OF MOLTEN GLASS
Filed June 21, 1930 2 Sheets-Sheet 1
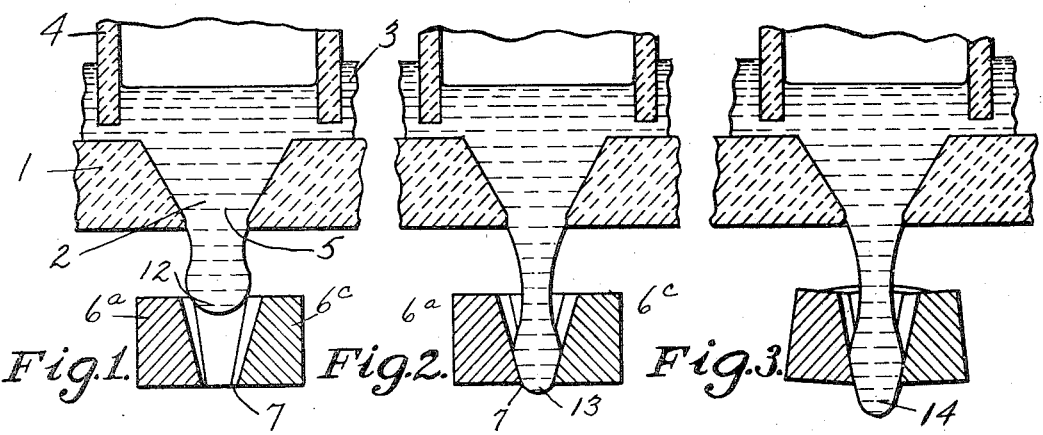
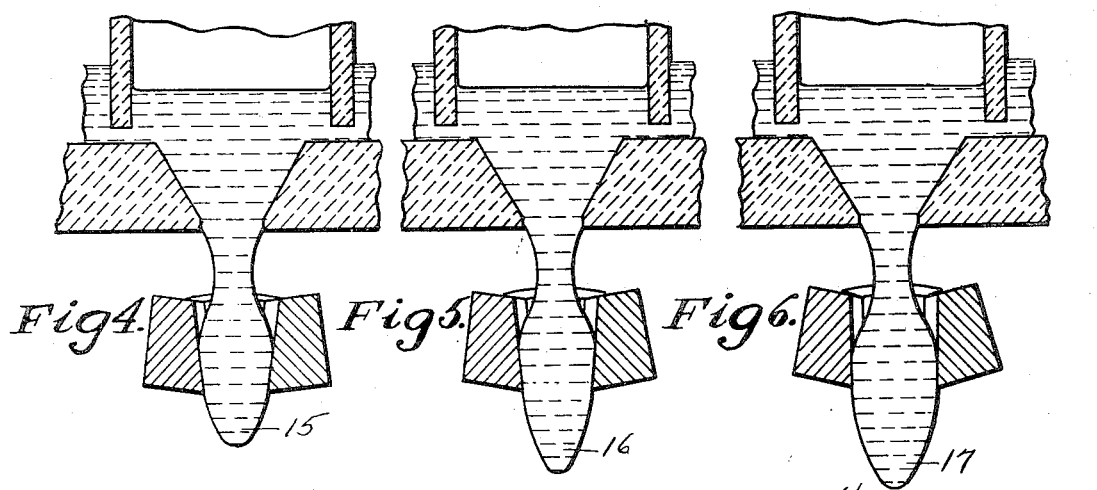
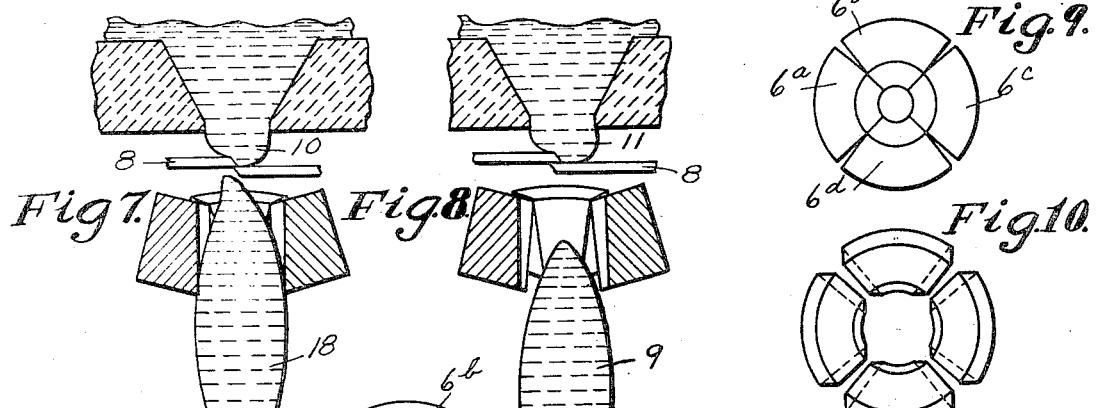
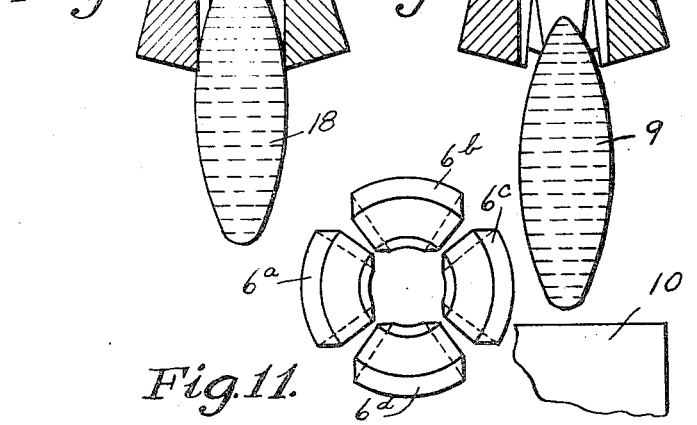
INVENTOR
George E. Howard
by Brown & Parham
Attorneys.

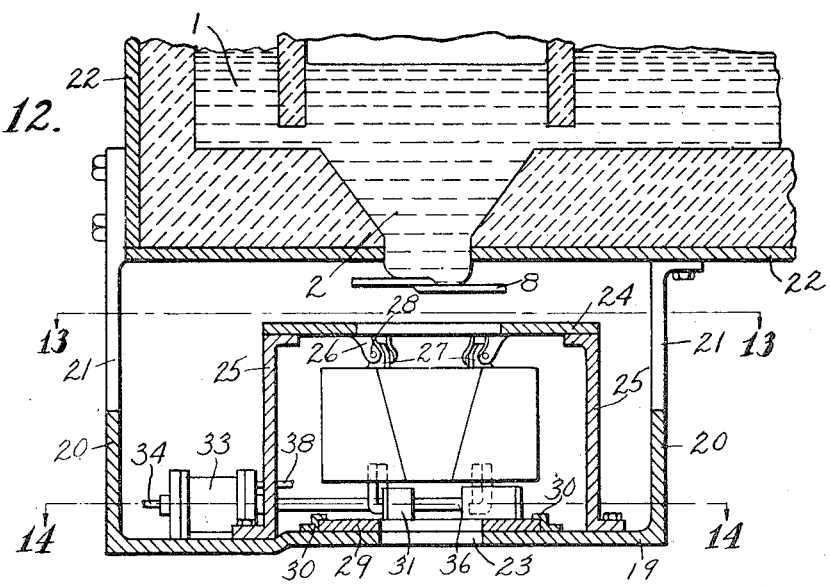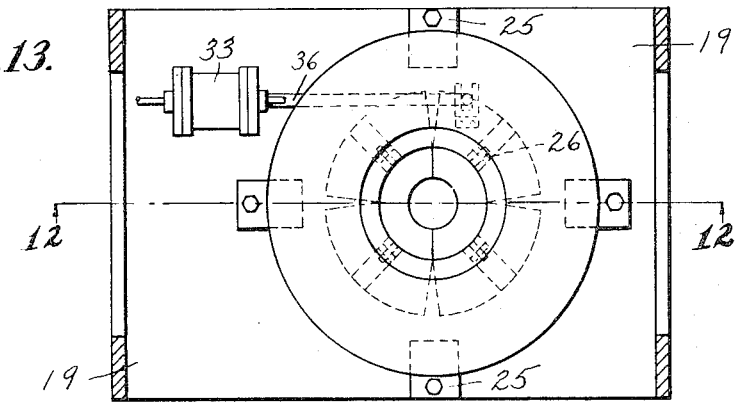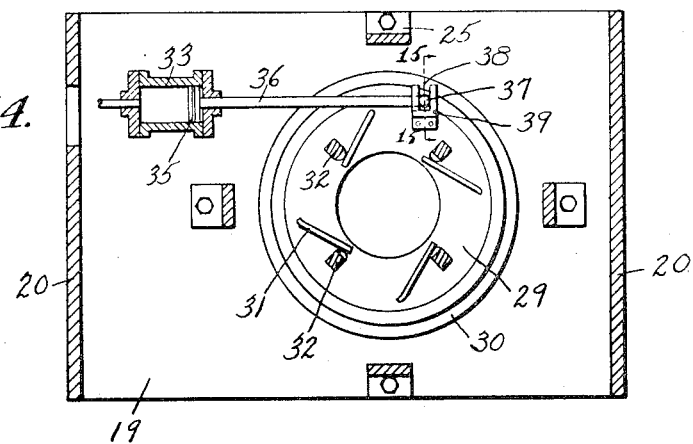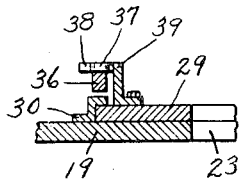

Patented Apr. 25, 1933

1,905,468

UNITED STATES PATENT OFFICE

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE

PROCESS AND APPARATUS FOR FORMING SHAPED MOLD CHARGES OF MOLTEN GLASS

Application filed June 21, 1930. Serial No. 462,795.

The process which forms a portion of the subject matter of the present invention comprises an improvement on the general method of mold charge formation wherein successive portions of a stream flowing from a parent body of molten glass are severed and deposited in the mold.

In the present invention an open ended receiver or cup which receives the glass from the outlet is parted, the parts or segments being arranged so as to move outwardly at the bottom to open or expand the cup, while their upper ends retain a substantially constant relation with each other, the cup being opened progressively during the operation of forming a mold charge.

Thus in the present invention the factors which operate to determine the shape of the mold charges are in part the husbanding and hindering effect of the contact of the molten glass with the surfaces of the cup and in part the effect of gravity on the glass suspended within and below the cup.

The shears cut the stream of glass, preferably above the cup, to sever the mold charge.

A relatively wide range of variation in mold charge shape may be obtained by regulating the time and/or speed of progressively opening the cup during the formation of a mold charge; and also by regulating the time of severing relative to the other phases.

Other manners of controlling the shape will appear from the following description.

I have also invented a new and improved apparatus which is adapted to work my improved process.

In the accompanying drawings wherein I have illustrated the operation of the preferred method of performing my improved process, and wherein also I have shown apparatus embodying in practical form the principles of my invention, Figs. 1 to 8 inclusive are views in vertical section through the receptacle containing the parent body of glass, the shears and the cup and illustrating the steps of my process as the same is hereinafter described.

Fig. 9 is a top plan view of the cup shown closed, as it is in the steps illustrated in Figs. 1 and 2 of the drawings.

Fig. 10 is a plan view showing the cup partially open, as it is in some of the intermediate steps of the process.

Fig. 11 is a top plan view of the cup showing it fully opened as it is at the completion of the process of the forming of a mold charge.

Fig. 12 is a section taken along the plane of the dotted lines 12—12 in Fig. 13 and showing a portion of the container of the parent body of glass, the shears, the same being shown closed, and the partible cup and its supporting and operating mechanism.

Fig. 13 is a horizontal section taken along the dotted lines 13—13 in Fig. 12.

Fig. 14 is a horizontal section taken along the dotted lines 14—14 in Fig. 12.

Fig. 15 is an enlarged detail in section showing the connection between the piston rod and the rotatable cam plate.

Referring first to Figs. 1 to 11 inclusive, 1 represents the container of the parent body of molten glass. This may be and usually is the shallow extension or spout of a glass-melting furnace. The container is provided with a submerged or bottom discharge opening 2 which is usually upwardly expanding to reduce the resistance to the downward travel of the molten glass, the parent body of which is indicated at 3.

A substantially constant level of glass is maintained in the container 1 and an adjustable regulator or valve of some sort, shown in the drawings as the vertically adjustable and revolving or revoluble tube 4, is provided to regulate and control the stream of glass flowing through the outlet 2 and indicated at 5. The purpose is to maintain a constantly flowing stream of homogeneous glass traveling through the outlet and of substantially uniform thickness.

Positioned below the outlet and alined axially therewith is a cup comprising a plurality of parts or segments, shown in the illustration as four in number and indicated at 6a, 6b, 6c and 6d. The cup segments are suitably supported in position, and in the manner illustrated in detail in Figs. 12 and 14 and the same will hereinafter be more fully described. For the present it is sufficient to say that the segments are supported in such a manner that their lower ends may be swung towards each other to close the cup and away from each other to open the cup, while their upper ends maintain a substantially constant relation.

In the drawings I have shown, for the sake of illustration, the cup composed of four segments, but it may be composed of two or any greater number of segments as may be found most convenient or desirable. When closed the segments form a cup having a downwardly contracting interior with a bottom opening 7, which opening is expanded or enlarged by swinging the cup parts apart. The shears indicated at 8 are shown as arranged to close below the lower end of and out of smearing relation with the outlet 2.

In Fig. 8 the shears are shown closed beneath the outlet and the mold charge illustrated at 9 dropping down from the cup into a mold indicated at 10. This is the last step in the operation of forming a mold charge and the sheared stub 11 is temporarily supported on the closed shears 8.

Referring now to Fig. 1, which illustrates the first step in the formation of a mold charge, the shears have opened and the sheared stud has sagged down as shown at 12 and is entering the upper end of the cup, whose segments are closed together as indicated in Fig. 1 and also in Fig. 9.

Fig. 2 illustrates the next step wherein the end of the stub has reached the bottom of the closed cup and has begun to protrude from the lower end of the same as indicated at 13. The opening 7 at the lower end of the closed cup is of proper size to hinder the downward movement of the glass and to cause the same to accumulate in the cup.

In Fig. 3 the cup has begun to open, as illustrated in said figure, and also in Fig. 10, thus enlarging the opening at the lower end of the cup and the lower portion of the mass of glass as indicated at 14 is now moving downwardly through the opening at the lower end of the cup, but owing to the relatively small increase in the capacity of said opening due to the movement of the segments of the cup, the rate of issuance of glass from the cup is still less than the flow of glass into the cup from above, and thus the glass continues to accumulate in the cup.

In Fig. 4 I illustrate the next step wherein the downwardly stretching of the lower end of the mass of glass indicated at 15 is continuing as is also the accumulation of the glass in the cup from the flowing stream.

During the next step, illustrated in Fig. 5, the cup segments are being progressively swung apart, thus expanding the bottom opening and augmenting the portion of glass depending below the outlet and indicated at 16.

In the next step, illustrated at Fig. 6, the expansion of the lower opening of the cup is now so great that the glass is stretching down out of and below the cup, as illusrated at 17, at a faster rate than it is accumulating in the cup.

In Fig. 7 the cup has attained its maximum expansion and the shears 8 are closing and thus severing the mold charge which is now depending within and below the cup, as indicated at 18. The sheared stub, indicated at 11, is supported on the shears.

In the last step of mold formation, indicated as above explained in Fig. 8, this stub has flattened out more or less on the shears, as is indicated at 10, and the latter are ready to open to initiate with the first step illustrated in Fig. 1.

The contact of the shears with the glass in severing the neck causes a chilled surface to be formed on the lower end of the depending stub, which chill is accentuated by the temporary support of the stub by the shears.

Upon the release of the stub from under support by the opening of the shears, the stub pulls downwardly, tending to form a globular end to the stream, which end forms the lower end of the mold charge about to be formed.

This chilled skin becomes partially reheated as the stub travels downwardly into and through the cup but is still not as fluid as the glass in the interior of the stream. The glass will slip slowly through the cup and through its bottom opening and its contact with the walls of the cup imparts to the glass a relatively hard and thin outer skin which aids in the final shaping of the mold charge as it is suspended below and within the cup.

This skin which forms on the glass acts to prevent the material deformation of the mass of glass by the expansion of the cup, as it prevents the glass from flowing laterally into the partings or cracks or in other words following the diverging cup segments. The fact that the glass is traveling downwardly within the cup and is in sliding contact with the walls of the latter also hinders the formation of irregularities or fins by the cracks of the cup. The downward travel of the glass prevents lateral pressure sufficient to force the glass outwardly into such cracks.

Furthermore as the cup opens the edges of the segments change in their direction from the line of the flow of the glass to a considerable angle thereto. The glass is traveling downwardly in a straight line and will thus move across said edges instead of riding on the same, thus avoiding local chilling.

The cup segments are preferably formed of metal or at least have their glass-contacting surfaces formed of metal. This metal is preferably nickel or an alloy thereof, such as nickel and chromium or nickel, zirconium and silicon. The glass will not stick to the surfaces of the cup-segments made of such material under ordinary working conditions, but will slide over the same without undue hinderance therefrom.

The cup is positioned at too short a distance below the outlet to permit the stream of glass to break out of control which would result in the formation of material laps and whorls, imprisoning air in the mass of glass and resulting in imperfect ware.

If desired, I may at the beginning of the operation of forming a mold charge position the cup at the proper elevation to receive the sheared stub without permitting the glass to break out of control and then move the cup downwardly as the glass accumulates therein so as to maintain at all times the top level of the glass in the cup at the proper distance from the outlet, so that the end of the stream will swell and spread laterally as it settles in the cup.

It is obvious that the final shape of the mold charge is determined by several factors.

Thus the husbanding or hindering effect of the walls of the cup and the stretching effect of gravity on the suspended mass of glass act to determine the shape of the mold charge, and therefore a relatively wide range of shapes in mold charges of substantially the same weight may be obtained by regulating the relation between these forces or effects. Again further shape regulation may be obtained by regulating the timing of the shear cut relative to the application of the forces above mentioned.

Further variation in shape may be effected by regulating the opening of the cup parts, thus varying the husbanding and skin-producing effects of the cup.

Variations in weight are more easily effected by regulating the time intervals between shear cuts and/or the position of the tube 4.

By the use of the present invention, successive portions of a stream of molten glass flowing continuously from a discharge outlet may be pre-shaped to fit the molds for which they are intended and severed, while they retain substantially the shape desired, for delivery en masse to such molds. The glass of such stream may be fed from the outlet while such glass has a temperature higher than that of glass suitable for feeding in "pre-shaped suspended" charges according to the usual methods of pre-shaping such charges in air while accumulating in suspension from the discharge outlet.

Referring now to Figs. 12 to 15 inclusive wherein I have illustrated an apparatus which, in addition to other uses to which it may be put, is suitable for working my improved process of mold charge formation, 19 represents a horizontally disposed platform which is disposed at a proper distance below the outlet 2 and which is supported from above from the container 1. Thus I have shown the platform provided with low vertical end walls 20 from which legs 21 extend upwardly and are bolted or otherwise secured to the metallic outer walls 22 of the container 1. The platform 19 is provided with a circular opening 23, preferably of greater diameter than the lower end of the outlet 2 and vertically alined therewith.

24 represents an annular plate supported in a horizontal position above the platform 19 as by means of the legs 25 whose upper ends are attached to or integral with said plate and whose lower ends are bolted to the platform 19. The central opening of the plate 24 is of greater diameter than the lower end of the outlet 2 and is axially alined therewith and with the opening 23 of the platform 19.

26 represents bifurcated hinge members extending downwardly and inwardly from the inner edge of the plate 24 and spaced ninety degrees apart, as best indicated in Fig. 13. The cup parts 6a, 6b, 6c and 6d are provided with upwardly extending pierced ears 27 which are inserted in the hinge members 26 and are assembled therewith by the pintles 28. The ears 27 are so placed that the cup parts will swing by gravity, when released, into their closed position as shown in Fig. 12 and also as illustrated in Fig. 9. If desired mechanical means for closing the cup parts may be provided.

29 is the cam carrier in the form of an annular plate having its central opening of corresponding size to the opening 23 in the platform 19 and the carrier 29 is rotatably mounted on the upper surface of the platform 19 with said openings in registration. The carrier 29 is held against displacement by the keeper ring 30 which is bolted or otherwise secured to the platform 19 and which overlaps the perimetral edge of the carrier 29.

The carrier 29 is provided with a vertical cam flange 31 for each of the cup parts, said cam flanges being relatively disposed in substantially the manner best indicated in Fig. 14. Each of the cup segments is provided with a depending finger 32 which is held in contact with the outer surface of the corresponding cam flange as by gravity or other means.

33 represents a fluid pressure cylinder provided at its ends with pipes 34 for the admission and relief of fluid pressure, which cylinder is mounted on the platform 19. 35 represents the piston in said cylinder and 36 its piston rod. The outer end of the piston rod is squared and is provided with a roller 37 which works in the slot 38 in a bifurcated bracket 39 which is bolted on the cam carrier 29, the slot 38 being disposed angularly to the axis of the piston rod, so that as the piston rod reciprocates the roller will move back and forth in said slot and oscillate the cam-carrier.

It is thus apparent that if the piston rod be moved toward the left in Figs. 12, 13 and 14 from its position therein shown, thus rotating the cam carrier 29, the cam flanges 31, by their engagement with the fingers 32, will swing the lower ends of the cup segments apart, thus progressively opening the cup. Likewise a reverse movement of the piston will cause the cup segments to close together, as by gravity.

Suitable means, such as are well known in the art, are provided for timing the operation of the shears and the opening of the cup parts, and for varying the relation between these operations.

What I claim is:—

1. In mechanism for forming mold charges, the combination of a container for a parent body of molten glass having a submerged outlet and periodically operated shears to sever the stream of glass flowing from the outlet, of a partible receiver positioned below the outlet and comprising a plurality of segments hinged at their upper ends so as to maintain a substantially constant top opening for the receiver, and means for progressively separating said segments while the glass is flowing into the receiver.

2. In mechanism for forming mold charges, the combination of a container for a parent body of molten glass having a submerged outlet and periodically operated shears to sever the stream of glass flowing from the outlet, of a partible receiver positioned below the outlet and having a restricted bottom opening and comprising a plurality of segments hinged at their upper ends so as to maintain a substantially constant top opening for the receiver, and means for progressively separating said segments while the glass is flowing into the receiver.

3. In mechanism for forming mold charges, the combination of a container for a parent body of molten glass having a submerged outlet and periodically operated shears to sever the stream of glass flowing from the outlet, of a partible receiver positioned below the outlet and comprising a plurality of segments hinged at their upper ends so as to maintain a substantially constant top opening for the receiver, and means engaging the lower ends of said segments for progressively separating the same while the glass is flowing into the receiver.

4. The method of feeding molten glass in a mold charge having an artificial shape which comprises, passing glass in a stream from a source of supply through a downwardly tapering passage having an orifice at its lower end to form the lower end of said charge, decreasing the taper of said passage and increasing the size of said orifice to increase the flow of glass while a suspended portion of the charge is formed and while the glass issuing from said passage is connected by said stream with said source of supply, and severing the charge when formed and before the same receives any substantial undersupport.

5. The method of controlling the formation of a mold charge mass of molten glass which comprises the steps of causing molten glass to pass downwardly from a source of supply through a substantially vertical flow passage until glass for the lower end portion of the charge desired has issued from and is in suspension from said flow passage, then causing an increase of cross section of a further portion of the accumulating suspended mold charge mass by expanding the portion of said flow passage that controls the rate of issuance and the cross section of the glass permitted to issue therefrom while the glass in said passage is still connected with glass of said source of supply and while maintaining the walls of the expanded portion of said passage in contact with the glass passing therethrough.

6. The method of controlling the formation of a suspended mold charge mass of molten glass, which comprises flowing glass in a stream from a source of supply through a downwardly directed open passage at a rate determined by pressure from above and the action of gravity modified by the frictional drag from the walls of the passage on the glass passing therethrough and regulably controlling the cross-section of different portions of a mold charge mass of issued glass in suspension below said passage by varying the cross-section of the portion of the passage from which glass issues to form said different portions of said suspended charge mass while the issuing glass is connected by said stream with said source of supply.

7. The method of feeding molten glass in a preformed charge, which comprises flowing glass downwardly in a stream from a discharge outlet into an annular glass receiving device having a downwardly decreasing cross section, permitting glass for the lower portion of said charge to issue from the lower end of said device into suspension therefrom, expanding the portion of said device from which the issuing glass is suspended to increase the rate of issuance of glass from the device and the cross-section of a portion of the glass in suspension thereblow, and severing the glass stream at a plane spaced below said discharge outlet when sufficient glass has passed below said severing plane to constitute the mold charge desired.

8. The method of feeding molten glass in a preformed charge, which comprises flowing glass downwardly in a stream from a discharge outlet into an annular glass receiving device in alignment with said outlet, permitting glass to issue from the lower end of said device and to accumulate in suspension therefrom, progressively expanding the portion of said device from which said issuing glass is suspended to produce an increase in the cross-sectional area of a portion of the accumulating suspended charge mass of glass while flow of glass from said stream into said device is continued, and severing the glass stream at a plane spaced below said discharge outlet when the glass between said severing plane and the plane of the lower end of the glass below said receiving and shaping device is sufficient for a mold charge and before such glass has received any substantial undersupport.

Signed at Pittsburgh, Pa. this 5th day of June, 1930.

GEORGE E. HOWARD.